United States Patent
Miyamoto

(10) Patent No.: US 11,662,962 B2
(45) Date of Patent: May 30, 2023

(54) IMAGE FORMING APPARATUS CAPABLE OF COPING WITH SPEEDUP OF PRINTING OPERATION WITHOUT REQUIRING DESIGN CHANGE OF CONTROLLER, AND CONTROL METHOD FOR IMAGE FORMING APPARATUS

(71) Applicant: CANON KABUSHIKI KAISHA, Tokyo (JP)

(72) Inventor: Takayuki Miyamoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/557,762

(22) Filed: Dec. 21, 2021

(65) Prior Publication Data
US 2022/0236931 A1   Jul. 28, 2022

(30) Foreign Application Priority Data

Jan. 27, 2021   (JP) .............................. JP2021-011238

(51) Int. Cl.
*G06F 3/12* (2006.01)
(52) U.S. Cl.
CPC .......... *G06F 3/1215* (2013.01); *G06F 3/1229* (2013.01); *G06F 3/1236* (2013.01); *G06F 3/1284* (2013.01)
(58) Field of Classification Search
CPC ......... G06F 3/1215; G06F 3/1236; G06F 5/06
USPC ............................................... 358/1.15, 1.16
See application file for complete search history.

(56) References Cited

U.S. PATENT DOCUMENTS

2008/0180470 A1\* 7/2008 Oku ...................... G06K 15/02
  347/5
2008/0239380 A1\* 10/2008 Takahashi .......... G03G 15/5004
  358/1.15

FOREIGN PATENT DOCUMENTS

JP   2019212027 A   12/2019

\* cited by examiner

*Primary Examiner* — Jamares Q Washington
(74) *Attorney, Agent, or Firm* — Rossi, Kimms & McDowell LLP

(57) ABSTRACT

An image forming apparatus capable of coping with speedup of a printing operation without requiring a design change of a controller is provided. The image forming apparatus includes an image generating unit configured to generate image data, an image forming unit configured to control image formation based on the image data, a storage unit that is provided between the image generating unit and the image forming unit and temporarily stores the image data, a first connecting unit that connects the image generating unit and the storage unit and performs transferring of the image data at a first operating frequency, and a second connecting unit that connects the storage unit and the image forming unit and performs transferring of the image data at a second operating frequency higher than the first operating frequency. When a predetermined data amount is accumulated in the storage unit, the accumulated image data is transferred to the image forming unit.

7 Claims, 6 Drawing Sheets

IMAGE FORMING APPARATUS CAPABLE OF COPING WITH SPEEDUP OF PRINTING OPERATION WITHOUT REQUIRING DESIGN CHANGE OF CONTROLLER, AND CONTROL METHOD FOR IMAGE FORMING APPARATUS

BACKGROUND OF THE INVENTION

Field of the Invention

The present invention relates to an image forming apparatus, and a control method for the image forming apparatus.

Description of the Related Art

A digital multifunction peripheral that has functions such as a scanner, a printer, and a copier is used. Operations of the digital multifunction peripheral are generally controlled by a controller for performing an image processing and image input/output control. As the said controller, an ASIC (Application Specific Integrated Circuit) is used in some cases. In recent years, the digital multifunction peripheral is required to be capable of coping with speedup of a printing operation. The printing operation requires a real-time processing that does not stop the printing operation after the start of the printing operation, until input/output of at least image data for a page being processed is completed. Here, a processing speed of the controller temporarily decreases in some cases. In order to perform the printing operation performed by the real-time processing, even in the case that the processing speed of the controller temporarily decreased, it is necessary to normally continue performing transfer of the image data between the controller and the printer or the like. Therefore, the digital multifunction peripheral is provided with a short-term buffer for temporarily storing the image data. The short-term buffer is implemented in the inside of the ASIC.

As a related technique, a technique disclosed in Japanese Laid-Open Patent Publication (kokai) No. 2019-212027 has been proposed. In the technique of Japanese Laid-Open Patent Publication (kokai) No. 2019-212027, even in the case that the value of a bus band detected by a band monitor exceeds a threshold value, if a residual data amount of the short-term buffer required for the real-time processing does not exceed the threshold value, access restriction of a bus master is not performed.

Due to the demand for speedup of the printing operation, a transfer rate of the image data from the short-term buffer built in the controller to the printer is insufficient in some cases. As a countermeasure at this time, it is conceivable to compensate for the shortage of the data transfer rate by shortening an interval between printing sheets, or to increase a frequency of data transfer performed by the controller. However, in the case that the interval between the printing sheets is shortened, there is a problem that it becomes difficult to satisfy restrictions on printing sheet conveyance and it is also difficult to secure a time for properly fixing an image on the printing sheet. On the other hand, in the case of increasing the data transfer rate from the controller, it is necessary to perform a design change of circuits of the controller such as the ASIC. Such a problem can occur in image forming apparatuses other than the digital multifunction peripheral.

SUMMARY OF THE INVENTION

The present invention provides an image forming apparatus capable of coping with speedup of a printing operation without requiring a design change of a controller, and a control method for the image forming apparatus.

Accordingly, the present invention provides an image forming apparatus comprising an image generating unit configured to generate image data, an image forming unit configured to control image formation based on the image data, a storage unit that is provided between the image generating unit and the image forming unit and temporarily stores the image data, a first connecting unit that connects the image generating unit and the storage unit and performs transferring of the image data at a first operating frequency, and a second connecting unit that connects the storage unit and the image forming unit and performs transferring of the image data at a second operating frequency higher than the first operating frequency, and wherein when a predetermined data amount is accumulated in the storage unit, the accumulated image data is transferred to the image forming unit.

According to the present invention, it is possible to cope with speedup of the printing operation without requiring the design change of the controller.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
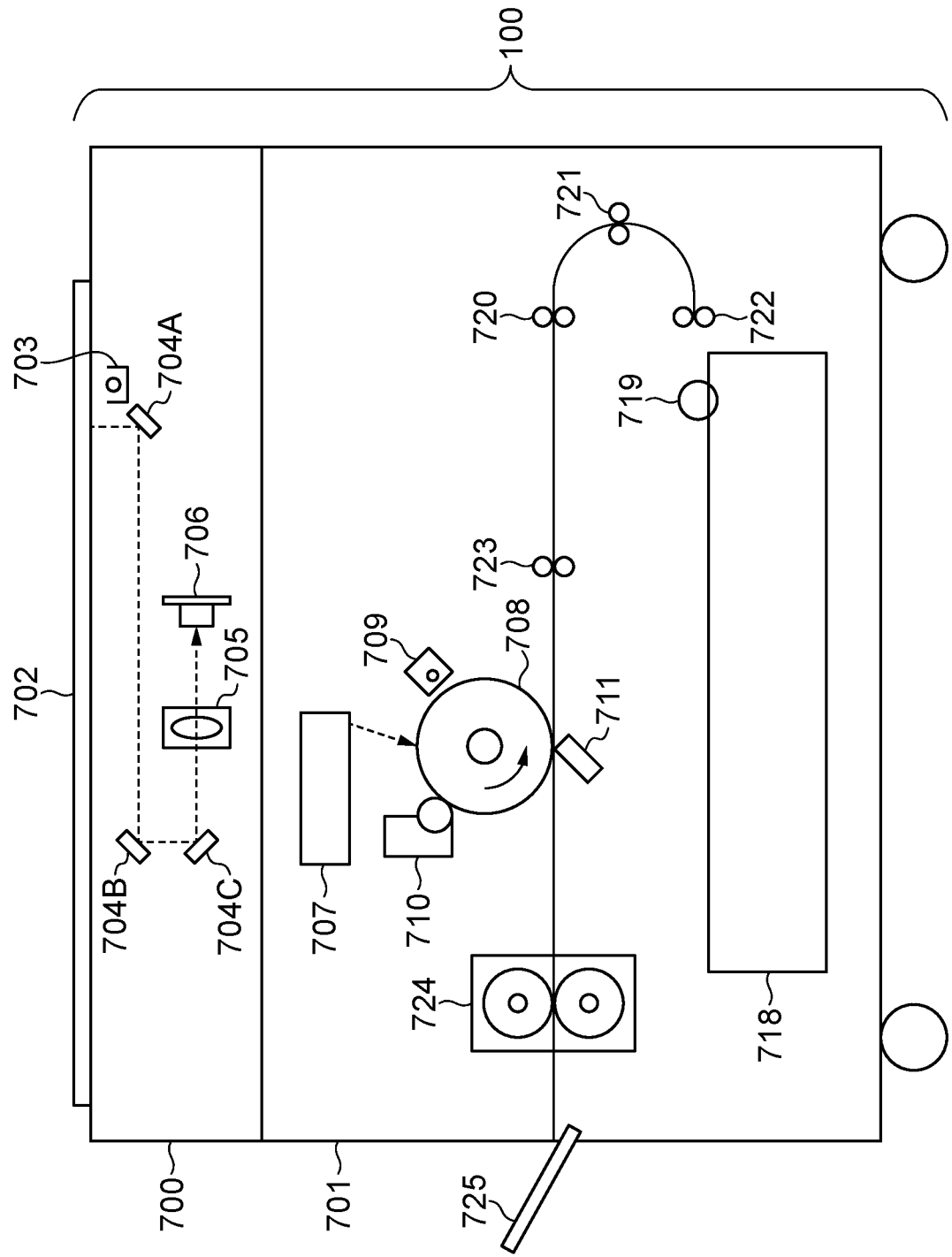
FIG. 1 is a section view that shows one example of a configuration of an image forming apparatus.

FIG. 1 is a section view that shows one example of a configuration of an image forming apparatus 100. The image forming apparatus 100 is, for example, a monochrome electrophotographic image forming apparatus. The image forming apparatus 100 may be, for example, a copier, a facsimile machine, a printer, a digital multifunction peripheral, a digital copier, or the like. Further, the image forming apparatus 100 may be a color electrophotographic image forming apparatus.

As shown in FIG. 1, the image forming apparatus 100 includes a reader 700 and an image printing apparatus 701. The reader 700 is an image reading apparatus. Reflected light from a document irradiated by an illumination lamp 703 at a reading position of the reader 700 is guided to a color sensor 706 by an optical system that includes reflection mirrors 704A, 704B, and 704C, and a lens 705. The reader 700 reads the light incident on the color sensor 706 for each of a blue (B) color, a green (G) color, and a red (R) color, and converts it into an electrical image signal. The reader 700 obtains image data by performing a color conversion processing based on the intensities of the image signals of B, G, and R, and outputs the said image data to an image control unit 1007 described later. Details of the image control unit 1007 will be described later.

A sheet storage tray 718 is provided in the inside of the image printing apparatus 701. A recording medium stored in the sheet storage tray 718 is fed by a sheet feeding roller 719 and then is sent out to a registration roller 723, which is in a stopped state, by conveying rollers 722, 721 and 720. A leading edge of the recording medium, which is conveyed in a conveyance direction by the conveying roller 720, abuts on a nip portion of the registration roller 723, which is in the stopped state. Then, the conveying roller 720 further conveys the recording medium in a state that the leading edge of the recording medium abuts on the nip portion of the registration roller 723 in the stopped state, and thereby, the recording medium is bent. As a result, an elastic force acts on the recording medium, and the leading edge of the recording medium abuts on the nip portion of the registration roller 723. In this way, a skew feeding correction of the recording medium is performed. After the skew feeding correction of the recording medium is performed, the registration roller 723 starts conveyance of the recording medium at a timing described later. The recording medium is a medium, on which an image is formed by the image forming apparatus 100. For example, the recording medium is a paper sheet, a resin sheet, a sheet of cloth, a transparency sheet (an OHP sheet), a label, or the like.

On the other hand, the image data obtained by the reader 700 is corrected by the image control unit 1007, and then is outputted to a laser scanner unit 707, which includes a laser and a polygon mirror, in accordance with a timing described later. Further, an outer peripheral surface of a photosensitive drum 708 is charged by a charging unit 709. After the outer peripheral surface of the photosensitive drum 708 is charged, a laser beam corresponding to the image data inputted into the laser scanner unit 707 is irradiated from the laser scanner unit 707 to the outer peripheral surface of the photosensitive drum 708. As a result, an electrostatic latent image is formed on a photosensitive layer (a photoreceptor) that covers the outer peripheral surface of the photosensitive drum 708. Moreover, operations of the laser scanner unit 707 will be described later.

The electrostatic latent image is developed by a toner within a developing unit 710, and a toner image is formed on the outer peripheral surface of the photosensitive drum 708. The toner image formed on the photosensitive drum 708 is transferred to the recording medium by a transfer charging unit 711, which is provided at a position (a transfer position) opposing to the photosensitive drum 708. The registration roller 723 feeds the recording medium to the transfer position in accordance with a timing, at which the toner image is transferred to a predetermined position of the recording medium. The recording medium, on which the toner image has been transferred, is fed to a fixing unit 724, and is heated and pressurized by the fixing unit 724, and thereby, the toner image is fixed on the recording medium. The recording medium, on which the toner image has been fixed, is discharged to a sheet discharging tray 725 attached to the image forming apparatus 100. In this way, the image has been formed on the recording medium by the image forming apparatus 100.

Figure 2:
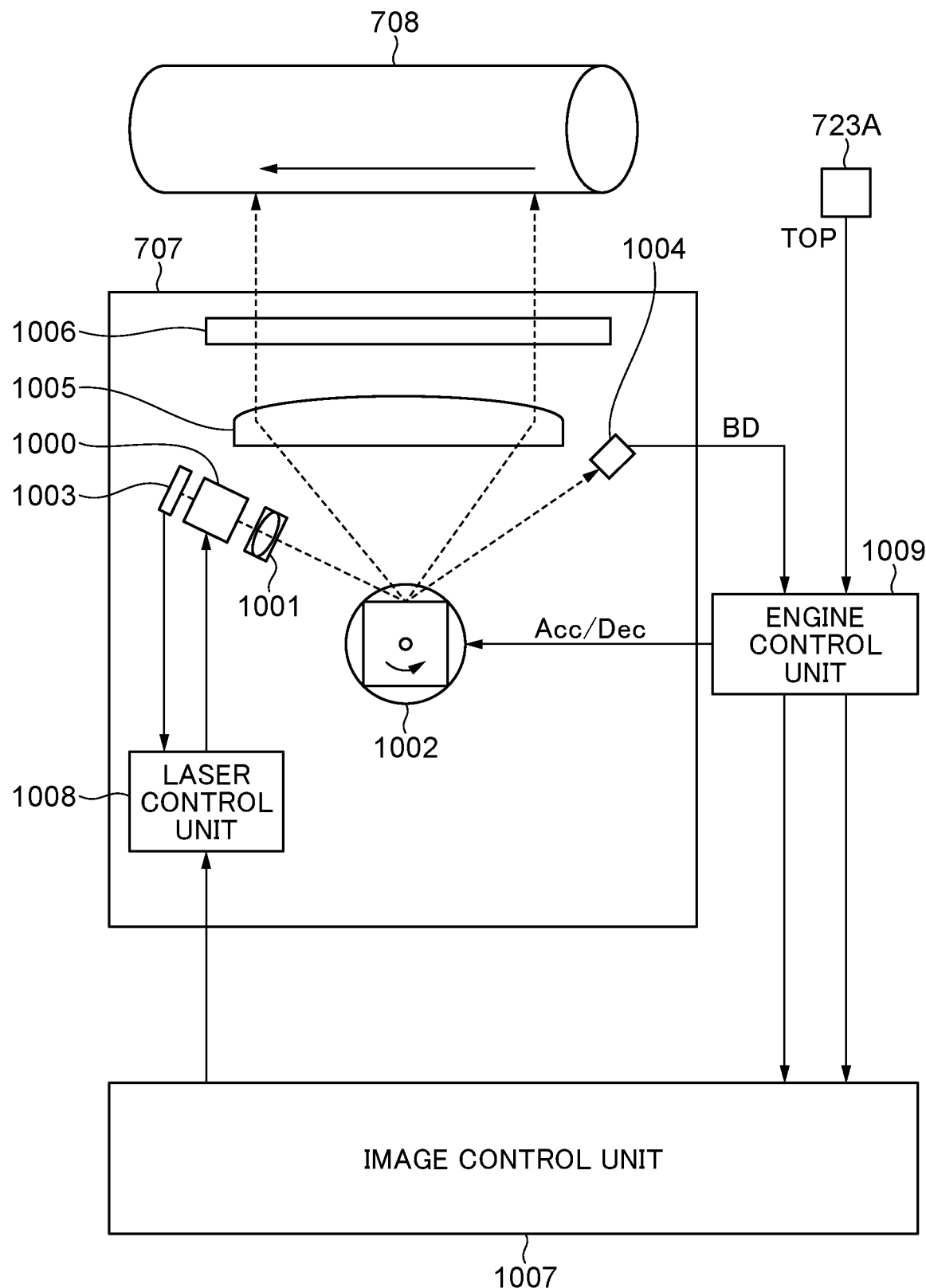
FIG. 2 is a block diagram that shows one example of a configuration of a laser scanner unit.

FIG. 2 is a block diagram that shows one example of a configuration of the laser scanner unit 707. The laser beam is emitted from both ends of a laser light source 1000. The laser beam emitted from one end of the laser light source 1000 is incident on a photodiode 1003. The photodiode 1003 converts the incident laser beam into an electric signal to generate a PD signal (a photodiode signal), and then outputs the PD signal to a laser control unit 1008. The laser control unit 1008 performs control of an output light amount of the laser light source 1000 based on the inputted PD signal so that the output light amount of the laser light source 1000 becomes a predetermined light amount. The said control of the output light amount is called APC (Auto Power Control).

On the other hand, the laser beam emitted from another end of the laser light source 1000 is irradiated to a polygon mirror 1002, which functions as a rotating polygon mirror, via a collimator lens 1001. The polygon mirror 1002 is rotationally driven by a polygon motor (not shown). The polygon motor is controlled by a drive signal (Acc/Dec), which is outputted from an engine control unit 1009. The laser beam irradiated to the polygon mirror 1002, which is rotating, is deflected by the polygon mirror 1002. Scanning of the outer peripheral surface of the photosensitive drum 708 by the laser beam, which has been deflected by the polygon mirror 1002, is performed in a direction from right to left shown in FIG. 2.

The laser beam that scans the outer peripheral surface of the photosensitive drum 708 is corrected by a F-θ lens 1005 so as to scan on the outer peripheral surface of the photosensitive drum 708 at a constant speed, and is irradiated to the outer peripheral surface of the photosensitive drum 708 via a folding mirror 1006. Further, the laser beam, which has been deflected by the polygon mirror 1002, is incident on a BD (Beam Detecting) sensor 1004, which functions as a light receiving unit having a light receiving element for receiving the said laser beam. In the present embodiment, during a period from the BD sensor 1004 detects the laser beam to the BD sensor 1004 detects the laser beam again, after the BD sensor 1004 detected the laser beam, the BD sensor 1004 is arranged at a position that the laser beam is irradiated to the outer peripheral surface of the photosensitive drum 708. For example, the BD sensor 1004 is arranged in an area that is positioned outside an area represented by a predetermined angle and is also positioned on an upstream side in a direction, in which the laser beam is scanned, among areas, through which the laser beam reflected by the polygon mirror 1002 pass.

The BD sensor 1004 generates a BD signal based on the detected laser beam and outputs it to the engine control unit 1009. The engine control unit 1009 controls the polygon motor based on the inputted BD signal so that a rotation cycle of the polygon mirror 1002 becomes a predetermined cycle. When a cycle of the BD signal becomes a cycle corresponding to the predetermined cycle, the engine control unit 1009 judges that the rotation cycle of the polygon mirror 1002 has become the predetermined cycle. The engine control unit 1009 controls a signal to be exposed on the photoreceptor by outputting an image formation BD signal to the image control unit 1007 in accordance with the inputted BD signal. The image formation BD signal is synchronized with the BD signal. The image formation BD signal corresponds to a signal that indicates one scanning cycle, in which the laser beam scans the photosensitive drum 708.

The image control unit 1007 outputs the corrected image data to the laser control unit 1008 in accordance with the inputted image formation BD signal and a timing signal (hereinafter referred to as "a TOP signal"), which is used for starting image formation and is inputted from a registration sensor 723A. The registration sensor 723A is a sensor that detects a paper sheet to be conveyed to the registration roller 723. The registration sensor 723A outputs the TOP signal when it detects a leading edge of the paper sheet to be conveyed. The laser control unit 1008 generates the laser beam for forming the image on the outer peripheral surface of the photosensitive drum 708 by turning on the laser light source 1000 based on the inputted image data. The laser control unit 1008 is controlled by the image control unit 1007. The generated laser beam is irradiated to the outer peripheral surface of the photosensitive drum 708 by the method described above.

Figure 3:
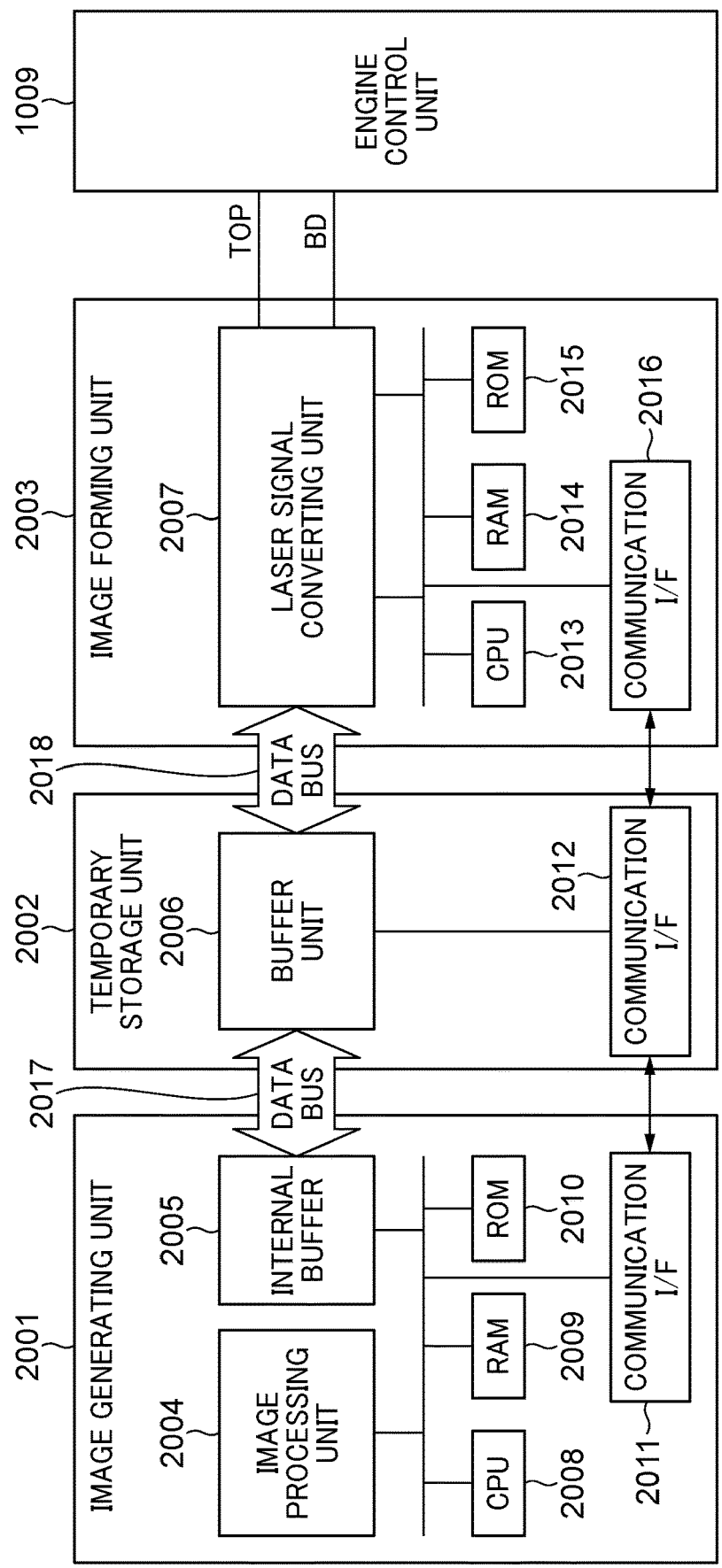
FIG. 3 is a diagram that shows one example of a configuration of an image control unit.

FIG. 3 is a diagram that shows one example of a configuration of the image control unit 1007. As shown in FIG. 3, the image control unit 1007 includes an image generating unit 2001, a temporary storage unit 2002, and an image forming unit 2003. The image generating unit 2001 includes an image processing unit 2004, an internal buffer 2005, a CPU (Central Processing Unit) 2008, a RAM (Random Access Memory) 2009, a ROM (Read Only Memory) 2010, and a communication I/F (interface) 2011. The image processing unit 2004 performs the color conversion processing with respect to the image data inputted from the reader 700, specifically, in the case that the image data inputted from the reader 700 is monochrome, the image processing unit 2004 performs the color conversion processing with respect to a black color, and in the case that the image data inputted from the reader 700 is color, the image processing unit 2004 performs the color conversion processing with respect to each of a yellow color, a cyan color, a magenta color, and the black color. The internal buffer 2005 is a short-term buffer for temporarily storing the image data that is processed by the image generating unit 2001, and transmits the image data to the temporary storage unit 2002 via a data bus 2017.

The CPU 2008 comprehensively controls various kinds of processing, which are executed by the image generating unit 2001 and the temporary storage unit 2002, based on control programs and the like that are stored in the ROM 2010. The RAM 2009 is a memory such as a DRAM (Dynamic Random Access Memory). Further, the RAM 2009 temporarily stores data and works as a working memory. The ROM 2010 is a nonvolatile memory, and stores boot programs, control programs, and the like of the image generating unit 2001 and the temporary storage unit 2002. The communication I/F 2011 transmits/receives register settings, status information, a transfer start request, an image request signal, etc. to/from the temporary storage unit 2002. The communication I/F 2011 is, for example, a serial communication I/F or the like.

The temporary storage unit 2002 is a storage unit that includes a buffer unit 2006 and a communication I/F 2012. The buffer unit 2006 temporarily stores the image data that is outputted from the image generating unit 2001, and outputs the stored image data to the image forming unit 2003 in response to receiving the image request signal from the image forming unit 2003. Here, an operating frequency (a first operating frequency) of the data bus 2017 between the image generating unit 2001 and the buffer unit 2006 is set to "fin", and an operating frequency (a second operating frequency) of a data bus 2018 between the buffer unit 2006 and the image forming unit 2003 is set to "fout". The frequency of the data bus is changed in the buffer unit 2006. A communication I/F 2007 transmits/receives the register settings, the status information, the transfer start request, the image request signal, etc. to/from the image generating unit 2001. Further, the communication I/F 2007 transmits an image preparation completion notification to the image forming unit 2003. The communication I/F 2007 is, for example, a serial communication I/F or the like.

The image forming unit 2003 includes a laser signal converting unit 2007, a CPU 2013, a RAM 2014, a ROM 2015, and a communication I/F 2016. The image forming unit 2003 controls the image formation on the paper sheet. The laser signal converting unit 2007 generates the image request signal on the basis of the TOP signal inputted from the registration sensor 723A and the image formation BD signal inputted from the engine control unit 1009, and then outputs the generated image request signal to the temporary storage unit 2002. Further, the laser signal converting unit 2007 converts the image data, which is inputted from the temporary storage unit 2002, into a laser signal, and then outputs the converted laser signal to the laser control unit 1008. The RAM 2014 is a memory such as a DRAM. Further, the RAM 2014 temporarily stores data and works as a working memory. The ROM 2015 is a nonvolatile memory, and stores a boot program, a control program, and the like of the image forming unit 2003. Further, the communication I/F 2016 receives the image preparation completion notification from the temporary storage unit 2002. The communication I/F 2016 is, for example, a serial communication I/F or the like.

Figure 4:
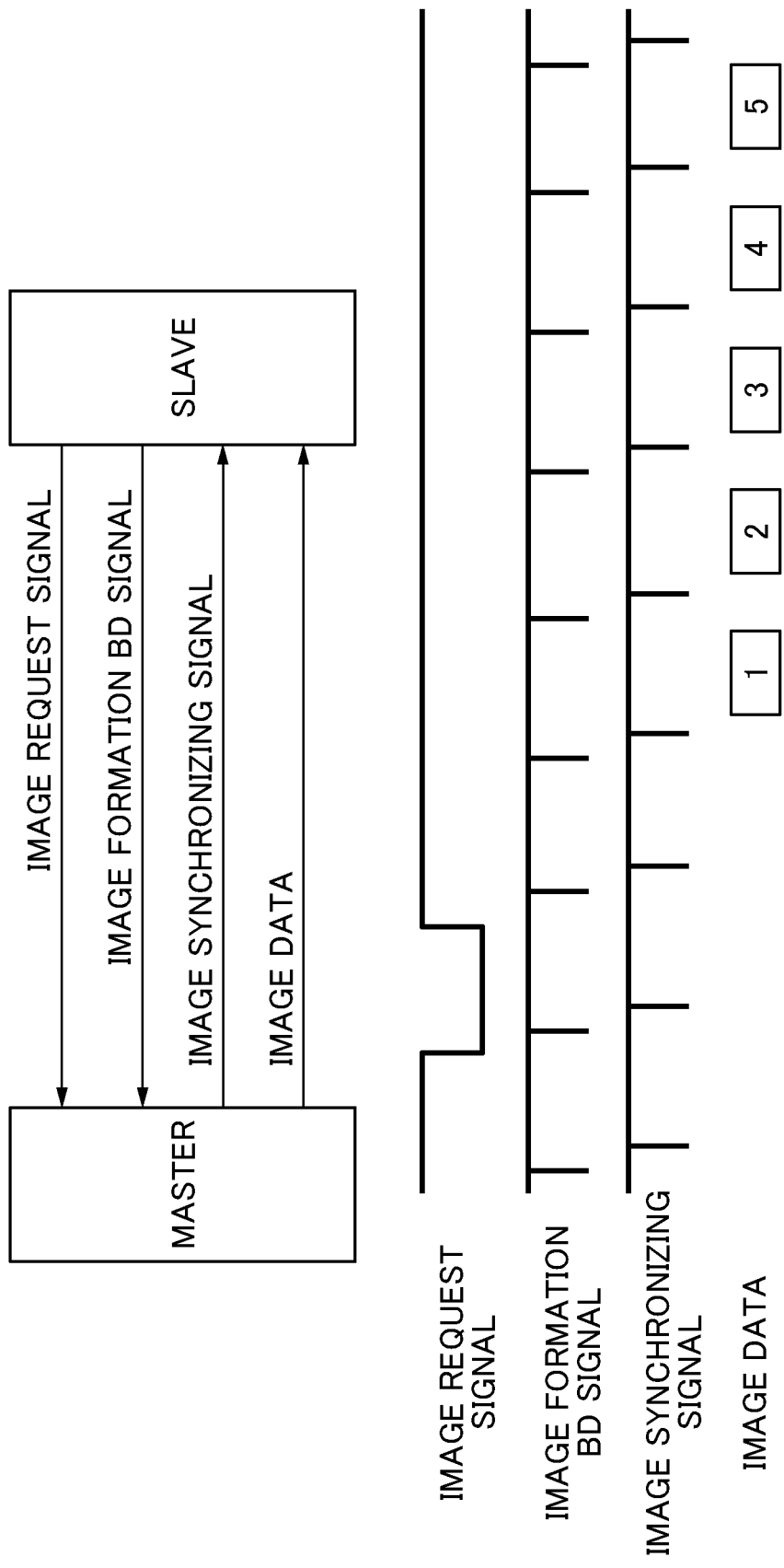
FIG. 4 is a figure that shows one example of a configuration of a data bus and timings of respective signals.

The image generating unit 2001 and the temporary storage unit 2002 are connected by the data bus 2017 that functions as a first connecting unit. Further, the temporary storage unit 2002 and the image forming unit 2003 are connected by the data bus 2018 that functions as a second connecting unit. The operating frequency of the data bus 2017 is different from the operating frequency of the data bus 2018. FIG. 4 is a figure that shows one example of a configuration of the data bus and timings of respective signals. In FIG. 4, a side that receives data will be described as a slave, and a side that transmits data will be described as a master.

The image request signal is a signal that requests the transfer start of the image data, and is transmitted from the slave to the master. When the image request signal is asserted, the master starts transferring of the image data. The image formation BD signal is a signal that is transmitted from the slave to the master, and is a main scanning synchronizing signal (a horizontal scanning synchronizing signal) that indicates the start of one line of the image data. When the master receives the image formation BD signal, it transmits an image synchronizing signal to the slave in synchronization with the image formation BD signal. The master transmits the image data to the slave line by line in synchronization with a timing, at which the image synchronizing signal is asserted.

Figure 5:
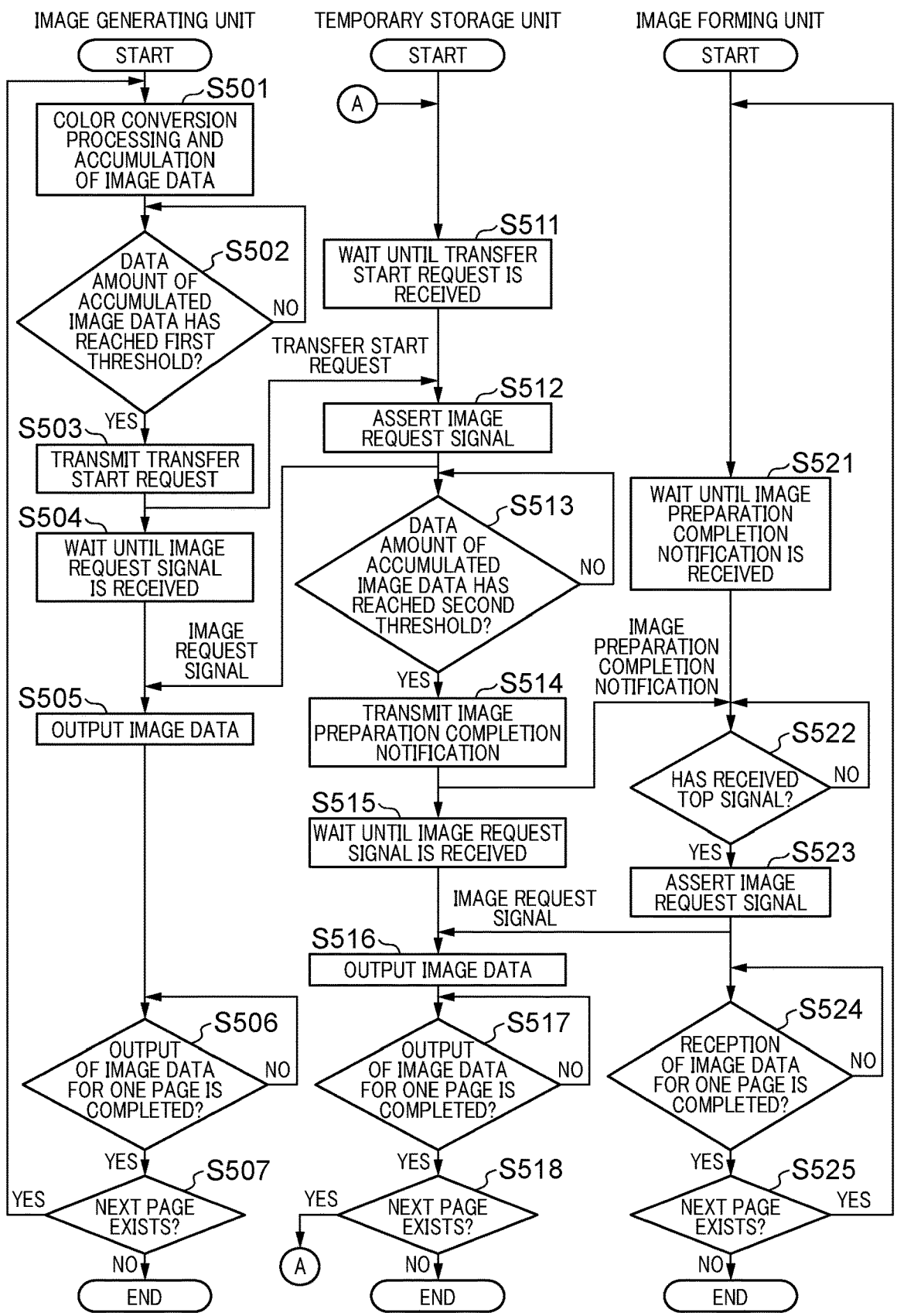
FIG. 5 is a sequence diagram that shows one example of the flow of processes of an image generating unit, processes of a temporary storage unit, and processes of an image forming unit when performing a printing operation.

FIG. 5 is a sequence diagram that shows one example of the flow of processes of the image generating unit 2001, processes of the temporary storage unit 2002, and processes of the image forming unit 2003 when performing a printing operation based on a job of printing a plurality of pages. Hereinafter, it is assumed that each process of the image generating unit 2001 and each process of the temporary storage unit 2002 are realized by the CPU 2008 executing the program. Further, it is assumed that each process of the image forming unit 2003 is realized by the CPU 2013 executing the program. Moreover, each process executed by the temporary storage unit 2002 may be performed by the CPU 2013 of the image forming unit 2003, or may be performed by a CPU built in the temporary storage unit 2002. Furthermore, a part or all of the image generating unit 2001, the temporary storage unit 2002, and the image forming unit 2003 may be predetermined circuits (for example, ASIC, FPGA (Field Programmable Gate Array), etc.). In this case, the processes of the image generating unit 2001, the processes of the temporary storage unit 2002, and the processes of the image forming unit 2003 of FIG. 5 are realized by the predetermined circuits executing programs stored in the predetermined circuits, respectively.

The CPU 2008 of the image processing unit 2004 starts the printing operation based on the job of printing the plurality of pages described above. In a step S501, the CPU 2008 sequentially performs the color conversion processing with respect to the image data inputted from the reader 700, and accumulates the image data, with respect to which the color conversion processing has been performed, in the internal buffer 2005. In a step S502, the CPU 2008 judges whether or not a data amount of the image data accumulated in the internal buffer 2005 has reached a first threshold value (another predetermined data amount). Further, the first threshold value can be set to any value. For example, the first threshold value may be set based on a ratio of a transfer rate for transferring data from the image processing unit 2004 to the internal buffer 2005 and a transfer rate for transferring data from the internal buffer 2005 to the temporary storage unit 2002. In the case that the CPU 2008 judges NO in the step S502, that is, in the case that the CPU 2008 judges that the data amount of the image data accumulated in the internal buffer 2005 has not reached the first threshold value, the CPU 2008 returns a processing flow to the step S502, and waits until the data amount of the image data accumulated in the internal buffer 2005 reaches the first threshold value. On the other hand, in the case that the CPU 2008 judges YES in the step S502, that is, in the case that the CPU 2008 judges that the data amount of the image data accumulated in the internal buffer 2005 has reached the first threshold value, the CPU 2008 advances the processing flow to a step S503.

In the step S503, the CPU 2008 transmits the transfer start request, which instructs to start the transferring of the image data via the communication I/F 2011 and the communication I/F 2012, to the buffer unit 2006. As will be described later, when the temporary storage unit 2002 receives the transfer start request, the temporary storage unit 2002 transmits the image request signal to the image generating unit 2001. In a step S504, the CPU 2008 waits until the image request signal from the temporary storage unit 2002 is received. In a step S505, when the CPU 2008 receives the image request signal from the temporary storage unit 2002, the CPU 2008 outputs the image data stored in the internal buffer 2005 to the buffer unit 2006 of the temporary storage unit 2002 via the data bus 2017. That is, the image data stored in the internal buffer 2005 is outputted to the buffer unit 2006 in synchronization with the image request signal.

In a step S506, the CPU 2008 judges whether or not outputting of the image data for one page to the internal buffer 2005 has been completed. In the case that the CPU 2008 judges NO in the step S506, that is, in the case that the CPU 2008 judges that the outputting of the image data for one page to the internal buffer 2005 has not been completed, the CPU 2008 waits until the outputting of the image data for one page to the internal buffer 2005 is completed. On the other hand, in the case that the CPU 2008 judges YES in the step S506, that is, in the case that the CPU 2008 judges that the outputting of the image data for one page to the internal buffer 2005 has been completed, the CPU 2008 advances the processing flow to a step S507. As described above, the CPU 2008 performs the processes of FIG. 5 based on the job of printing the plurality of pages. In the step S507, the CPU 2008 judges whether or not a next page exists based on the job of printing the plurality of pages. In the case that the CPU 2008 judges NO in the step S507, since the next page does not exist, the CPU 2008 terminates the processing. On the other hand, in the case that the CPU 2008 judges YES in the step S507, since the next page exists, the CPU 2008 returns the processing flow to the step S501. In this case, the CPU 2008 resumes each process from the step S501.

Next, the processes of the temporary storage unit 2002 will be described. As described above, the temporary storage unit 2002 is controlled by the CPU 2008. When the printing operation is started, the processes of the temporary storage unit 2002 of FIG. 5 are executed. In a step S511, the CPU 2008 waits until the transfer start request is received from the image generating unit 2001. In a step S512, when the CPU 2008 receives the transfer start request, the CPU 2008 asserts the image request signal of the data bus 2017, and requests the image generating unit 2001 to transfer the image data from the internal buffer 2005. As described above, the image generating unit 2001 outputs the image data to the temporary storage unit 2002 in the step S505. The image data outputted from the image generating unit 2001 is accumulated in the buffer unit 2006 of the temporary storage unit 2002. In a step S513, the CPU 2008 judges whether or not the data amount of the image data accumulated in the buffer unit 2006 has reached a second threshold value. The second threshold value is a predetermined data amount that is set in advance.

In the present embodiment, in order to substantially match the operating frequency "fin" when performing the transferring of the image data via the data bus 2017 with the operating frequency "fout" when performing the transferring of the image data via the data bus 2018, the temporary storage unit 2002 is provided. That is, the second threshold value is set to a value such that the operating frequency "fin" matches the operating frequency "fout" when the engine control unit 1009 is used as a reference. This point will be described later. Moreover, the second threshold value does not have to be a value such that the operating frequency "fin" completely matches the operating frequency "fout".

In the case that the CPU 2008 judges NO in the step S513, that is, in the case that the CPU 2008 judges that the data amount of the image data accumulated in the buffer unit 2006 has not reached the second threshold value, the CPU 2008 returns the processing flow to the step S513, and waits until the data amount of the image data accumulated in the buffer unit 2006 reaches the second threshold value. On the other hand, in the case that the CPU 2008 judges YES in the step S513, that is, in the case that the CPU 2008 judges that the data amount of the image data accumulated in the buffer unit 2006 has reached the second threshold value, the CPU 2008 advances the processing flow to a step S514. In the step S514, the CPU 2008 transmits a notification (the image preparation completion notification), which indicates that outputting preparation of the image data is completed, to the image forming unit 2003. As will be described later, the image forming unit 2003 outputs the image request signal to the temporary storage unit 2002 in response to receiving the image preparation completion notification and the TOP signal. In a step S515, the CPU 2008 waits until the image request signal is received from the image forming unit 2003.

The temporary storage unit 2002 receives the image request signal from the image forming unit 2003. In a step S516, when the image request signal received from the image forming unit 2003 is asserted, the CPU 2008 outputs the image data accumulated in the buffer unit 2006 to the image forming unit 2003 via the data bus 2018. That is, the image data accumulated in the buffer unit 2006 is outputted to the image forming unit 2003 in synchronization with the image request signal.

In a step S517, the CPU 2008 judges whether or not outputting of the image data for one page to the image forming unit 2003 has been completed. In the case that the CPU 2008 judges NO in the step S517, that is, in the case that the CPU 2008 judges that the outputting of the image data for one page to the image forming unit 2003 has not been completed, the CPU 2008 returns the processing flow to the step S517, and waits until the outputting of the image data for one page to the image forming unit 2003 is completed. On the other hand, in the case that the CPU 2008 judges YES in the step S517, that is, in the case that the CPU 2008 judges that the outputting of the image data for one page to the image forming unit 2003 has been completed, the CPU 2008 advances the processing flow to a step S518. In the step S518, the CPU 2008 judges whether or not the next page exists based on the job of printing the plurality of pages. In the case that the CPU 2008 judges NO in the step S518, since the next page does not exist, the CPU 2008 terminates the processing. On the other hand, in the case that the CPU 2008 judges YES in the step S518, since the next page exists, the CPU 2008 returns the processing flow from "A" to the step S511. In this case, the CPU 2008 resumes each process from the step S511.

Next, the processes of the image forming unit 2003 will be described. As described above, the image forming unit 2003 is controlled by the CPU 2013. When the printing operation is started, the processes of the image forming unit 2003 of FIG. 5 are executed. In the step S514 described above, the temporary storage unit 2002 transmits the image preparation completion notification to the image forming unit 2003. In a step S521, the CPU 2013 waits until the image preparation completion notification is received from the temporary storage unit 2002. In a step S522, the CPU 2013 judges whether or not the TOP signal described above has been received from the engine control unit 1009. In the case that the CPU 2013 judges NO in the step S522, that is, in the case that the CPU 2013 judges that the TOP signal described above has not been received from the engine control unit 1009, the CPU 2013 returns the processing flow to the step S522, and waits until the TOP signal is received.

On the other hand, in the case that the CPU 2013 judges YES in the step S522, that is, in the case that the CPU 2013 judges that the TOP signal described above has been received from the engine control unit 1009, the CPU 2013 advances the processing flow to a step S523. In the step S523, the CPU 2013 asserts the image request signal (a signal that requests the image data) from the laser signal converting unit 2007 in response to receiving the TOP signal and the image preparation completion notification, and requests the temporary storage unit 2002 to transfer the image data. As described above, the temporary storage unit 2002 outputs the image data to the image forming unit 2003 in the step S516. When the image forming unit 2003 receives the image data from the temporary storage unit 2002, the image forming unit 2003 performs a control to execute the image formation of the received image data.

In a step S524, the CPU 2013 judges whether or not receiving of the image data for one page from the temporary storage unit 2002 has been completed. In the case that the CPU 2013 judges NO in the step S524, that is, in the case that the CPU 2013 judges that the receiving of the image data for one page from the temporary storage unit 2002 has not been completed, the CPU 2013 returns the processing flow to the step S524, and waits until the receiving of the image data for one page from the temporary storage unit 2002 is completed. On the other hand, in the case that the CPU 2013 judges YES in the step S524, that is, in the case that the CPU 2013 judges that the receiving of the image data for one page from the temporary storage unit 2002 has been completed, the CPU 2013 advances the processing flow to a step S525. In the step S525, the CPU 2013 judges whether or not the next page exists based on the job of printing the plurality of pages. In the case that the CPU 2013 judges NO in the step S525, since the next page does not exist, the CPU 2013 terminates the processing. On the other hand, in the case that the CPU 2013 judges YES in the step S525, since the next page exists, the CPU 2013 returns the processing flow to the step S521. In this case, the CPU 2013 resumes each process from the step S521.

Figure 6:
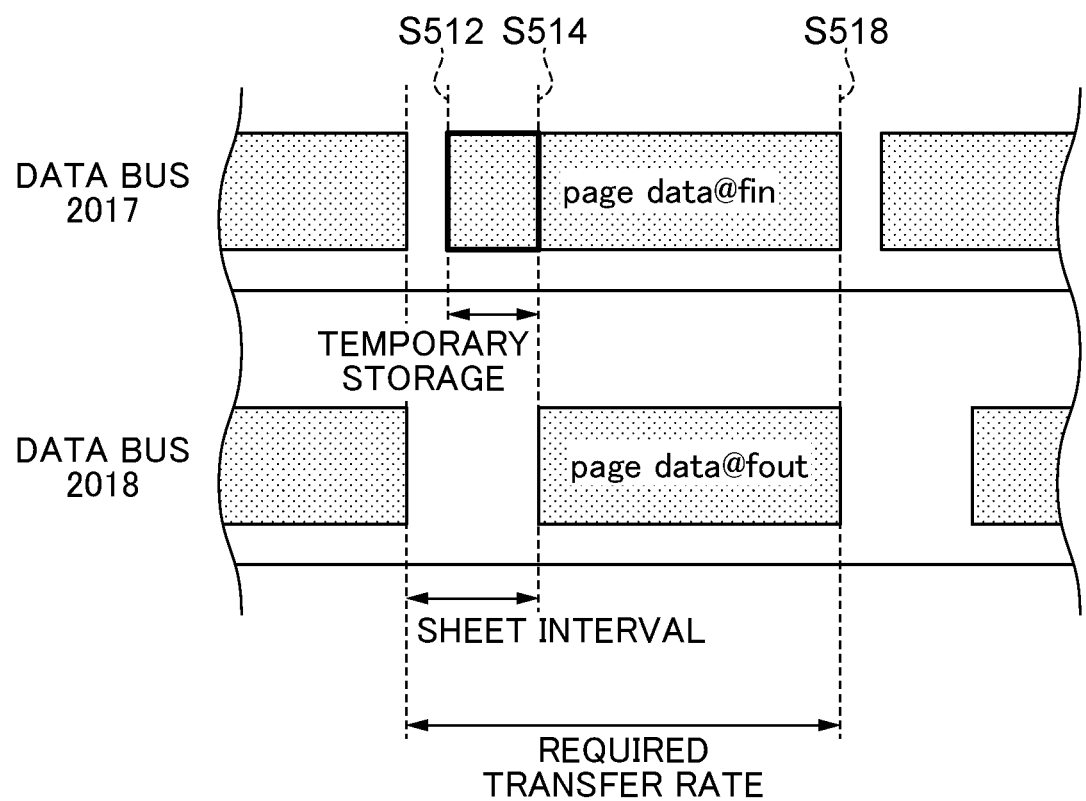
FIG. 6 is a figure that shows one example of image data in the data buses.

FIG. 6 is a figure that shows one example of the image data in the data bus 2017 and the data bus 2018. The data bus 2017 is a data bus between the image generating unit 2001 and the temporary storage unit 2002, and the data bus 2018 is a data bus between the temporary storage unit 2002 and the image forming unit 2003. In FIG. 6, "pagedata@fin" indicates the image data that is transferred at the operating frequency "fin", and "pagedata@fout" indicates the image data that is transferred at the operating frequency "fout". As described above, the operating frequency "fout" is higher than the operating frequency "fin". For example, a transfer rate (the operating frequency "fin") of the data bus 2017 is 135 Hz, and a transfer rate (the operating frequency "fout") of the data bus 2018 is 150 Hz. Moreover, the operating frequency "fin" and the operating frequency "fout" are not limited to these values.

A temporary storage shown in FIG. 6 indicates the data, which is accumulated in the buffer unit 2006 of the temporary storage unit 2002 during a period from the step S512 to the step S514, among the image data. Further, a sheet interval shown in FIG. 6 indicates an interval between the paper sheets required when performing a continuous printing. Furthermore, a required transfer rate shown in FIG. 6 indicates a speed of the printing operation required when performing the continuous printing.

Here, in a conventional configuration, the temporary storage unit 2002 does not intervene between the image generating unit 2001 and the image forming unit 2003. In this case, since the image forming unit 2003 transmits the image data to the laser control unit 1008 by a pipeline processing, the image forming unit 2003 cannot transmit/receive the image data until the registration sensor 723A detects the leading edge of the paper sheet. That is, the image request signal cannot be asserted until the TOP signal inputted from the engine control unit 1009 is received.

Therefore, the image forming apparatus 100 of the present embodiment is provided with the temporary storage unit 2002 between the image generating unit 2001 and the image forming unit 2003. Further, the operating frequency "fout" of the data bus 2018 between the image forming unit 2003 and the temporary storage unit 2002 is set to be higher than the operating frequency "fin" of the data bus 2017 between the image generating unit 2001 and the temporary storage unit 2002.

Since the image request signal is asserted in the step S512 of FIG. 5, the image data from the image generating unit 2001 is accumulated in the buffer unit 2006 of the temporary storage unit 2002 before the image forming unit 2003 receives the TOP signal. That is, before the TOP signal is asserted, the image data is transferred from the image generating unit 2001 to the buffer unit 2006 of the temporary storage unit 2002 in advance. As shown in FIG. 6, it is assumed that the transfer rate required for the printing operation is the operating frequency "fout" of the data bus 2018. Further, the operating frequency "fin" of the data bus 2017 is lower than the operating frequency "fout" of the data bus 2018. Even in this case, the image data corresponding to a difference between the operating frequency "fout" and the operating frequency "fin" is accumulated in the buffer unit 2006 of the temporary storage unit 2002 in advance.

In the example of FIG. 6, the data amount of the image data corresponding to the temporary storage shown in FIG. 6 among the "pagedata@fin" is accumulated in the temporary storage unit 2002. Thereby, the sum of the interval between the paper sheets of the "pagedata@fin" and the data corresponding to the temporary storage shown in FIG. 6 can be matched with the sheet interval shown in FIG. 6 of "pagedata@fout". Therefore, when the engine control unit 1009 is used as the reference (that is, when viewed from the engine control unit 1009), it is possible to substantially match the operating frequency "fout" of the data bus 2018 with the operating frequency "fin" of the data bus 2017. Thereby, the interval between the paper sheets (an interval required for fixing the image on the paper sheet, or the like) can be properly maintained. As a result, even in the case that the operation of the continuous printing is speeded up, it is possible to properly perform the continuous printing without requiring a design change of circuits of the image generating unit 2001 that is realized by a controller such as the ASIC.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-011238, filed Jan. 27, 2021, which is hereby incorporated by reference herein in its entirety.

What is claimed is:

1. An image forming apparatus comprising:
    an image generating unit configured to generate image data;
    an image forming unit configured to control image formation based on the image data;
    a storage unit that is provided between the image generating unit and the image forming unit and temporarily stores the image data;
    a first connecting unit that connects the image generating unit and the storage unit and performs transferring of the image data from the image generating unit to the storage unit, provided between the image generating unit and the image forming unit, at a first operating frequency; and
    a second connecting unit that connects the storage unit and the image forming unit and performs transferring of the image data from the storage unit, provided between the image generating unit and the image forming unit, to the image forming unit at a second operating frequency higher than the first operating frequency,
    wherein in a case where a predetermined data amount is accumulated in the storage unit provided between the image generating unit and the image forming unit, the accumulated image data is transferred from the storage unit, provided between the image generating unit and the image forming unit, to the image forming unit, and
    wherein in a case where a data amount of image data accumulated in the storage unit has reached the predetermined data amount, the storage unit outputs a notification, which indicates that preparation for outputting of the image data is completed, to the image forming unit.

2. The image forming apparatus according to claim 1, wherein the predetermined data amount is a data amount according to a ratio of the first operating frequency to the second operating frequency.

3. The image forming apparatus according to claim 1, wherein the predetermined data amount is a data amount that makes the first operating frequency match the second operating frequency.

4. The image forming apparatus according to claim 1, wherein the image forming unit outputs a signal that requests transfer start of image data to the storage unit in response to receiving of a signal, which indicates that it is a timing to start the image formation, and the notification.

5. The image forming apparatus according to claim 4, wherein the image forming unit performs a control to execute the image formation based on image data received via the second connecting unit.

6. The image forming apparatus according to claim 1, wherein in a case where a data amount of the generated image data has reached another predetermined data amount, the image generating unit outputs the generated image data to the storage unit.

7. A control method for an image forming apparatus that comprises
    an image generating unit configured to generate image data;
    an image forming unit configured to control image formation based on the image data; and
    a storage unit that is provided between the image generating unit and the image forming unit,
    the control method comprising:
    transferring the generated image data from the image generating unit to the storage unit, provided between the image generating unit and the image forming unit, via a first connecting unit that connects the image generating unit and the storage unit and operates at a first operating frequency;

temporarily storing the transferred image data in the storage unit; and transferring the accumulated image data from the storage unit, provided between the image generating unit and the image forming unit, to the image forming unit via a second connecting unit that connects the image forming unit and the storage unit and operates at a second operating frequency higher than the first operating frequency in a case where a predetermined data amount is accumulated in the storage unit provided between the image generating unit and the image forming unit; and outputting a notification, which indicates that preparation for outputting of the image data is completed, from the storage unit to the image forming unit, in a case where a data amount of image data accumulated in the storage unit has reached the predetermined data amount.

* * * * *